March 31, 1964
R. E. TAFEL
3,126,828
SAFETY-ARMING DEVICE
Filed March 20, 1962
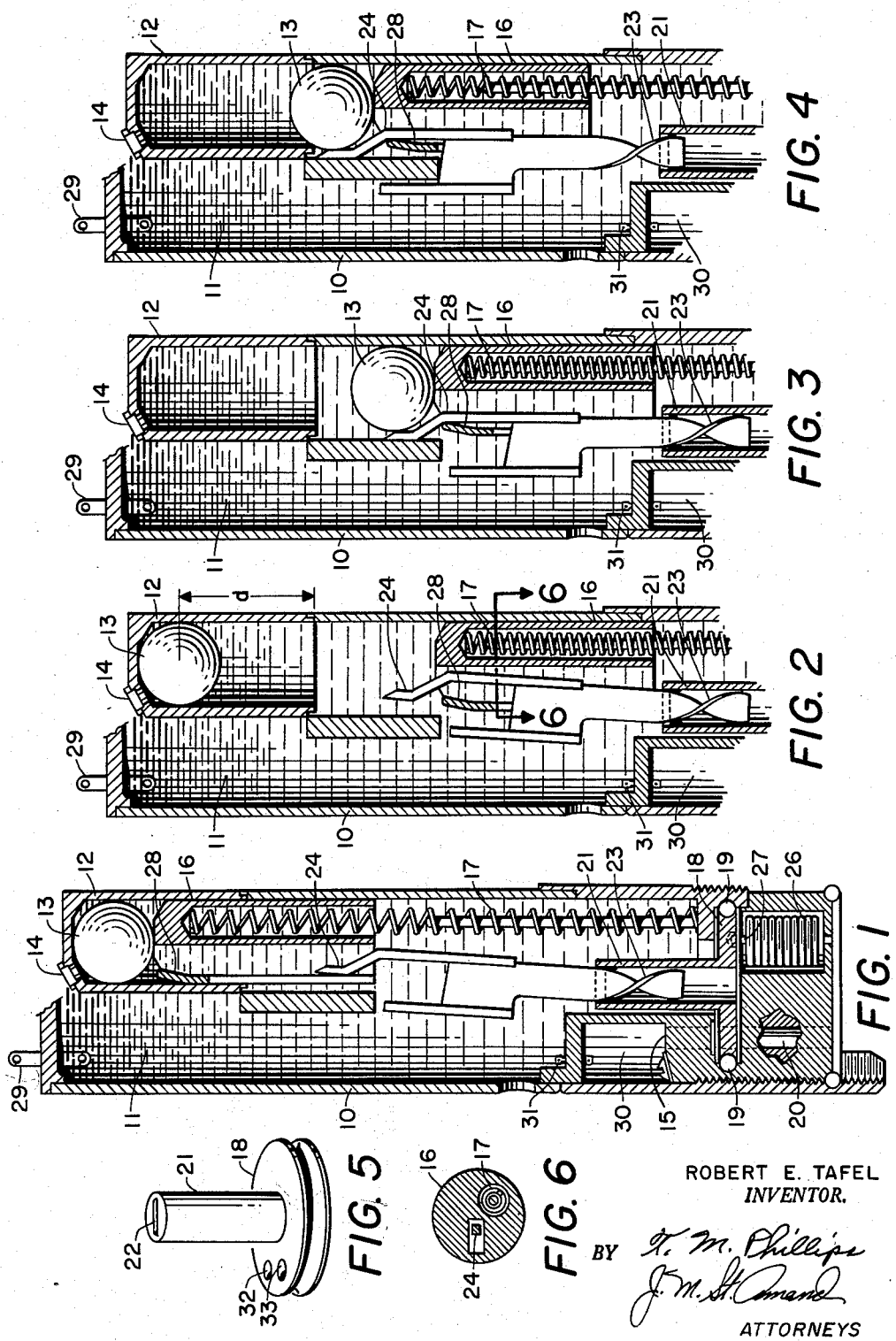
ROBERT E. TAFEL
INVENTOR.

United States Patent Office 3,126,828
Patented Mar. 31, 1964

3,126,828
SAFETY-ARMING DEVICE
Robert E. Tafel, Riverside, Calif., assignor to the United States of America as represented by the Secretary of the Navy
Filed Mar. 20, 1962, Ser. No. 181,213
2 Claims. (Cl. 102—78)
(Granted under Title 35, U.S. Code (1952), sec. 266)

The invention herein described may be manufactured and used by or for the Government of the United States of America for governmental purposes without the payment of any royalties thereon or therefor.

The present invention relates to safety-arming devices and more particularly to safety-arming devices wherein the time delay is accomplished by means of a fluid integrator.

Several approaches have been made to provide safety-arming devices which will accurately respond to acceleration or deceleration of warheads to arm them at the proper time. The present invention provides a safety-arming device which depends upon the flow of fluid through a knife edged orifice as a delaying means so that the warhead will have traveled a safe distance from the launching means before being armed. The flow of an incompressible fluid through a knife-edged orifice in the closed end of a tube containing a close fitting spherical ball which is under the influence of an accelerating force may be expressed as follows: (It is assumed that the tube is submerged in a silicone fluid.)

$$V_j = \sqrt{2gh} \tag{1}$$

where:

$V_j$=jet velocity—cm./sec.,
$g$=gravitational acceleration—cm./sec.$^2$,
$h$=fluid head—cm.

Losses due to turbulence and fluid viscosity reduce the velocity of the jet. If a coefficient of velocity, $C_v$, is introduced to take account of these losses, then, $$V_j = C_v\sqrt{2gh} \tag{2}$$

and $$q = C_v A_j \sqrt{2gh} \tag{3}$$

where:

$q$=volume of fluid flow—cm.$^3$/sec.,
$A_j$=area of the jet at its smallest diameter—cm.$^2$.

$$A_j = A_0 C_c \tag{4}$$

where:

$A_0$=area of orifice—cm.$^2$.
$C_c$=a coefficient of jet contraction;

$$q = C_v C_c A_0 \sqrt{2gh} \tag{5}$$

and combining $C_v C_c = C_d$, $$q = C_d A_0 \sqrt{2gh} \tag{6}$$

The fluid pressure (P) (grams/cm.$^2$), at the orifice derived from the acceleration loading is $$P = \frac{W_b G_m}{A_b} \tag{7}$$

wherein:

$W_b$=weight of ball—gm.,
$G_m$=a constant missile acceleration—g's,
$A_b$=ball projected area—cm.$^2$.

The equivalent fluid head ($h$) (cm.), is $$h = \frac{P}{W_s} \tag{8}$$

where $W_s$=specific weight of the fluid—gm./cm.$^3$; and substituting Equation 7 into Equation 8, $$h = \frac{W_b G_m}{A_b W_s} \tag{9}$$

and combining Equation 9 into Equation 6, $$q = C_d A_0 \sqrt{\frac{2g W_b G_m}{A_b W_s}} \tag{10}$$

The rate of motion of the ball ($V_b$) (cm./sec.), is $$V_b = \frac{q}{A_b} = C_d A_0 \frac{\sqrt{\frac{2g W_b G_m}{A_b W_s}}}{A_b}$$

$$= C_d A_0 \sqrt{\frac{2g W_b G_m}{A_b^3 W_s}} \tag{11}$$

Ball displacement ($D_b$) (cm.), is $$D_b = V_b t = C_d A_0 \sqrt{\frac{2g W_b G_m}{A_b^3 W_s}} \cdot t \tag{12}$$

where $t$=time—sec.

For a specific mechanism at a constant temperature, $C_d$, $A_0$, $g$, $W_b$, $A_b$, and $W_s$ are all constant, hence Equation 12 can be rewritten $$D_b = K_1 \sqrt{G_m} \cdot t \tag{13}$$

and the time ($t_x$), for the ball to complete its stroke ($D_{bx}$), under a constant level of acceleration can be expressed by $$t_x = \frac{D_{bx}}{K_1 \sqrt{G_m}} \tag{14}$$

The distance ($D_{mx}$), that the missile travels during the same time period ($t_x$), is $$D_{mx} = \tfrac{1}{2} G_m t_x^2 \tag{15}$$

Substituting Equation 14 for ($t_x$) in Equation 15, $$D_{mx} = \tfrac{1}{2} G_m \frac{D_{bx}^2}{K_1^2 G_m} = \tfrac{1}{2} \frac{D_{bx}^2}{K_1^2}$$

showing that at a constant temperature and a constant level of acceleration, the hydraulically restarted ball will complete its stroke coincident with the instant that a missile reaches a fixed distance from its launching site.

Accordingly an object of the present invention is to provide a safety-arming device which responds to axial acceleration without being affected by lateral accelerations.

A further object of the invention is the provision of a distance integrating means which has a true and accurate response to axial accelerations without being affected by lateral accelerations.

Other objects and many of the attendant advantages of this invention will become readily appreciated as the same becomes better understood by reference to the following detailed description when considered in connection with the accompanying drawings wherein:

FIG. 1 is a sectional view of a preferred embodiment of the invention.

FIGS. 2 through 4 show the sequence of operation of the embodiment of FIG. 1.

FIG. 5 shows the barrier plate used in the embodiment of FIG. 1.

FIG. 6 shows a section taken along the line 6—6 of FIG. 2.

Referring now to the drawings wherein like or corresponding reference numerals designate like or corresponding parts throughout the several views, there is shown in FIG. 1 a sealed cylinder 10 forming the housing for the device and containing silicone oil 11 or any other suitable fluid. A smaller cylinder or tube 12 containing a ball 13 is positioned to one side and in the forward portion of cylinder 10. A knife edged orifice 14 is provided at the forward end of cylinder 12 to permit fluid to flow therethrough. Ball 13 is held in an abutting position to the forward end of cylinder 12 by G-weight 16, the function of which will be described below. G-weight 16 is urged in this position by spring 17 and held in this position before launch by any suitable latch means (not shown).

The firing train consists of a dual set of primers (not shown) which may be inserted in holes 15 and explosive leads 20 which are interrupted by a circular barrier plate 18 that rotates on ball bearing 19. A hollow shaft 21 closed at the free end and integral with plate 18 is provided with a slot 22 in the free end through which the spiral portion 23 of a lever 24 is inserted. Bellows 26 is provided to compensate for fluid expansion and has a pin 27 attached thereto which can be received in a recessed portion of barrier plate 18 in the event of loss of liquid. Electrical tabs 29 and 31 are provided to carry electricity through the sealed portion of the device.

Prior to launch, G-weight 16 is held in the forward position by means of spring 17 as shown in FIG. 1. When a missile containing the device is launched, the launch latch (not shown) is released and the accelerating force causes G-weight 16 to move to the aft position shown in FIG. 2. Ball 13 will move, restrained by fluid flow through orifice 14, according to the equation $$t_x = \frac{d}{K_1 \sqrt{G_m}}$$

where:

$t_x$ = time of travel in seconds
$d$ = distance traveled in centimeters
$K_1$ = constant
$G_m$ = a constant missile acceleration measured in g's through the distance, $d$, and then drops to the position shown in FIG. 3 moving lever 24, as also shown in FIG. 3. In this position lever 24 engages lip 28 of G-weight 16. Upon loss of acceleration or during deceleration G-weight 16 moves forward, by force of spring 17, taking with it lever 24 and ball 13. Spiral portion 23 of lever 24 passes through slot 22 in shaft 21 of barrier plate 18 and, upon being drawn through, rotates barrier plate 18 to its armed position. FIG. 4 shows the movement of G-weight 16, ball 13 and lever 24 from the position shown in FIG. 3 to the forward position. Thus, lever 24 and spiral 23 remain stationary until lever 24 is moved laterally by ball 13 to engage lip 28 of G-weight 16 as shown in FIG. 3. In the armed position the holes 32, 33 in barrier plate 18 are aligned with the electric detonators or primers, not shown, in holes 15 and the output explosive leads 20. Cavity 30 is provided in container 10 to permit loading of the primers.

Obviously many modifications and variations of the present invention are possible in the light of the above teachings. It is therefore to be understood that within the scope of the appended claims the invention may be practiced otherwise than as specifically described.

What is claimed is:

1. In a missile fuze safety-arming device, the combination comprising:
    (a) a housing adapted to contain an incompressible fluid,
    (b) a tube mounted parallel to the longitudinal axis of the missile within said housing having one end closed except for a knife edged orifice,
    (c) an inertia weight mounted in said housing for longitudinal movement in said housing and said tube,
    (d) an inertia ball positioned in said housing for longitudinal movement between the closed end of said tube and said inertia weight and being responsive to acceleration forces to move in a direction away from the closed end of said tube at a predetermined rate,
    (e) resilient means engaging said inertia weight and urging said inertia weight into said tube for holding said ball against the closed end of said tube during the absence of sufficient acceleration forces applied to said device to overcome the force of said resilient means,
    (f) a rotor mounted for limited rotation about a longitudinal axis within said housing,
    (g) an explosive train consisting of a detonator and an explosive lead interrupted by said rotor,
    (h) an opening extending through said rotor and adapted to be moved into alignment with said detonator and the exploding lead,
    (i) and means responsive to movement of said ball out of said tube for mechanically coupling said rotor and said inertia weight for translating the longitudinal movement of said inertia weight into rotational movement of said rotor.

2. The safety-arming device of claim 1 wherein the predetermined rate is determined by the flow of fluid through said orifice.

References Cited in the file of this patent

UNITED STATES PATENTS

| | | |
|---|---|---|
| 2,164,115 | Lasserre | June 27, 1939 |
| 2,764,093 | McCuistion | Sept. 25, 1956 |
| 2,896,540 | Voland | July 28, 1959 |
| 2,958,285 | Marshall | Nov. 1, 1960 |
| 2,994,272 | Saunderson | Aug. 1, 1961 |
| 3,034,438 | Apotheloz et al. | May 15, 1962 |

FOREIGN PATENTS

| | | |
|---|---|---|
| 714,540 | Great Britain | Sept. 1, 1954 |